United States Patent [19]

Prior

[11] 4,337,153
[45] Jun. 29, 1982

[54] WATER SOFTENING APPARATUS

[75] Inventor: William C. Prior, Newbury, Ohio

[73] Assignee: Kinetico, Inc., Newbury, Ohio

[21] Appl. No.: 180,374

[22] Filed: Aug. 22, 1980

[51] Int. Cl.$^3$ ............................................. B01J 47/14
[52] U.S. Cl. ..................................... 210/288; 210/350
[58] Field of Search ................. 210/97, 137, 190, 191,
210/279, 288, 350, 351

[56] References Cited

U.S. PATENT DOCUMENTS

| | | | |
|---|---|---|---|
| 3,180,825 | 4/1965 | Couvreur et al. | 210/350 |
| 3,891,552 | 6/1975 | Prior et al. | 210/190 |
| 3,965,000 | 6/1976 | Mikule et al. | 210/351 |

FOREIGN PATENT DOCUMENTS 1348973 12/1963 France .

*Primary Examiner*—Ivars C. Cintins
*Attorney, Agent, or Firm*—Watts, Hoffmann, Fisher & Heinke Co.

[57] ABSTRACT

An improved resin tank for a water softening apparatus including an expansible chamber 50 that enlarges during fluid flow through the tank to displace any free space in the tank, thereby maintaining the compactness of the water softening material. The expansible chamber 50 is formed by an elastomeric sleeve 52 that is secured to and surrounds a portion of a downwardly extending fluid conduit 46 and overlies at least one aperture 54 formed in the conduit wall through which fluid communication is established. The pressure drop normally occurring during fluid flow through the tank generates a pressure differential force on the sleeve wall 52a that causes it to enlarge if free space in the tank is present. In an alternate embodiment, the fluid communication between the conduit and the chamber 50 is provided by a pitot tube 62 that is disposed in the conduit fluid flow path and is operative to communicate the velocity pressure of the fluid flowing down the conduit 46 to the chamber 50.

10 Claims, 3 Drawing Figures

WATER SOFTENING APPARATUS

TECHNICAL FIELD

The present invention relates generally to fluid treatment apparatus and in particular to a new and improved resin tank for a water softener.

Water softening is usually achieved by an "ion exchange" process in which "hard" water is passed through a resin bed to exchange its "hard" ions of calcium and magnesium for "soft" sodium ions from the resin bed. Regeneration of the resin bed is required periodically to remove the accumulation of hard ions and replenish the supply of soft ions. Regeneration is effected by flushing a solution of salt, i.e. a brine solution, through the resin bed.

Commercially available water softeners generally include one or two tanks which contain the softening chemicals that form the resin beds. In a two-tank water softener, one tank is regenerated and kept "off-line" while the other tank is "on-line". A control valve controls the communication of the tanks with the household water supply and controls the timing and sequence of regeneration. One such system and control valve is disclosed in U.S. Pat. No. 3,891,552, also owned by the present assignee.

A prior art resin tank typically comprises an elongate cylinder in which the ion exchange resin is contained. A conduit often called a riser pipe extends downwardly from the top of the tank. A filter screen mounted at the end of the conduit prevents the entry of resin into the conduit.

An opening is formed in the top of the tank for discharging or admitting fluid depending on the direction of flow. In many, if not most water softening systems in use today, water to be softened is admitted at the top of the tank and travels downwardly through the resin bed until it enters the conduit at the bottom of the tank. This fluid flow direction is often termed "down-flow" service and is necessary in most instances to prevent separation or "fluffing" of the resin bed which has been found to degrade softening efficiency. By introducing the water at the top of the tank, the water pressure tends to maintain material compactness within the tank.

During regeneration, "counterflow" brining is often employed because it has been found to increase regeneration efficiency. In those systems in which service is "downflow", counterflow brining will be "upflow", that is, the brine solution is introduced at the bottom of the tank by the conduit and flows upwardly through the resin bed until it is discharged through the opening at the top of the tank. In order to prevent resin bed separation during brining, the flow rate of the brine solution is usually restricted and carefully controlled.

Although the present day water softeners employing downflow service perform satisfactorily, it has been found that higher water softening efficiencies could be obtained if the water service was upflow, but only if separation or fluffing of the resin bed could be prevented.

Completely filling the resin tank with resin was tried as a solution, but was unsuccessful because the volume of the resin varies over its useful life and during the service and regeneration cycles. Another proposed solution to the problem was to restrict the water flow rate below a level that caused separation. Such a proposal is not feasible because it would limit the water flow rate to unacceptable levels.

DISCLOSURE OF INVENTION

The present invention when embodied in a water softening system provides a new and improved resin tank in which compactness of the resin bed is maintained regardless of flow rate and/or flow direction through the tank.

In the preferred embodiment, the present invention comprises an enclosed vessel that defines a volume for containing fluid treatment material, e.g., an ion exchange resin, and a fluid conduit that opens into the vessel. An opening is provided near the top of the vessel for admitting or discharging fluid. The opening is spaced from the end of the fluid conduit so the fluid flowing between the opening and the end of the conduit must pass through the resin. According to the invention, an expansible chamber in fluid communication with the conduit is disposed within the vessel and is surrounded by the resin. In operation, the static pressure of fluid flowing in the conduit acts on the expansible chamber causing it to enlarge within the tank and thereby maintain compactness of the resin regardless of the fluid flow rate or direction. This is accomplished independently of the density or quantity of the resin in the tank.

When the present invention is embodied in a water softening apparatus, a resin tank is provided that is not sensitive to fluid flow rates or direction. The expansible member will enlarge to fill any portion of the tank volume not filled by resin and therefore water flow from the bottom to the top of the tank can occur without causing resin bed separation and without the necessity of restricting the water flow rate. The net result is a "high efficiency" water softening apparatus.

In the preferred embodiment, the expansible chamber is defined by bladder-like member formed from a flexible membrane. Fluid pressure communicated to the interior of the member effects substantially amorphous expansion of the membrane wall provided that the pressure exerted on the outside of the membrane wall is less than the interior pressure.

According to a further aspect of this embodiment, the flexible member comprises an elastomeric sleeve constructed of a material such as vinyl. The sleeve surrounds a portion of the conduit and overlies at least one aperture formed in the conduit wall through which fluid communication is established. The ends of the sleeve are sealingly clamped to the conduit above and below the aperture. The tubular wall of the sleeve extending between the clamped ends then defines an expansible volume for displacing "free space" within the tank. Essentially the member expands to a volume equivalent to the tank volume not filled with the softening chemicals.

Although the present invention is intended primarily for water softeners having "upflow" service, it will also improve the operation of conventional "downflow" service systems which have upflow backwash and/or brining cycles. The present invention when incorporated on these systems will prevent resin bed separation during the "upflow" regeneration cycles and obviate the need for critical flow controls.

In operation, the chamber formed by the sleeve is expanded by the pressure differential that exists between the water flowing in the conduit and the water passing through the resin bed. A pressure drop normally occurs between the end of the conduit (which forms the tank inlet in an upflow system) and the outlet located at the top of the tank. Consequently, the pressure of fluid flowing through the resin bed is less than the conduit fluid pressure. The resulting pressure differential felt by the membrane wall causes fluid from the conduit to enter the chamber formed by the elastic sleeve causing it to expand.

The present invention also contemplates an apparatus for generating an increased expansion force for a given conduit fluid pressure. In a preferred embodiment, the apparatus comprises a pitot tube mounted in the conduit and positioned in the path of fluid flow. The pitot tube extends into fluid communication with the chamber formed by the sleeve and communicates the associated velocity pressure of the fluid to the interior of the chamber. As is well known, the velocity pressure of a moving fluid is higher than its static pressure and thus the pressure acting on the interior of the chamber is increased over that which would be provided by an aperture in the wall of the conduit. In other words, the pressure differential felt by the wall of the elastic sleeve is enhanced and the sleeve expands with a greater force.

Additional features and a fuller understanding of the invention will be obtained in reading the following detailed description made in connection with the accompanying drawings.

BEST MODE FOR CARRYING OUT THE INVENTION

Figure 1:
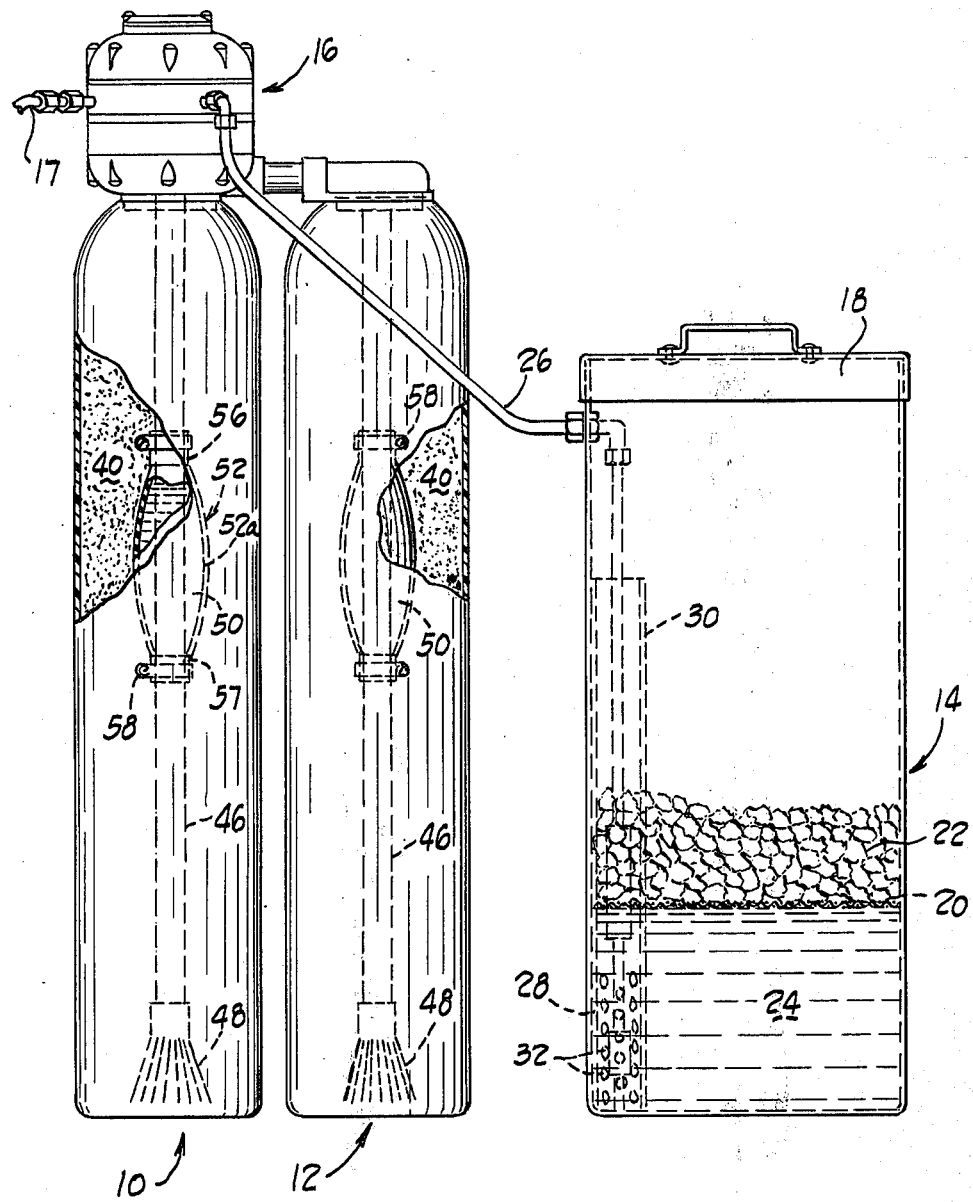
FIG. 1 is an elevational view, partially in cross-section, of a water softening apparatus incorporating the present invention.

FIG. 1 illustrates the overall construction of a water softener system that incorporates the present invention. The system shown includes a pair of resin tanks 10, 12, an upstanding brine tank 14 and a valve assembly 16 fastened to the tanks 10, 12. The valve 16 controls which of the tanks 10, 12 is placed "on-line" with the household water supply and also controls the regeneration cycle of an exhausted tank. A drain conduit 17 connected to the valve 16 discharges brine solution and "backwash" fluid during a regeneration cycle.

The brine tank 14 is of known configuration and comprises a cylindrical, upstanding container capped by a removable cover 18. A screen 20 is disposed horizontally across the container a predetermined distance above the bottom. A granular salt supply, indicated generally by the reference character 22, is supported by the horizontal screen. A brine solution reservoir 24 is then defined below the screen 20. The reservoir 24 communicates with the valve assembly 16 through a conduit 26, the fluid communication being controlled by a brine valve 28 (shown schematically). The brine valve is disposed within a brine well 30 that comprises a downwardly extending tube having apertures 32 at its lower end through which the brine solution is admitted. The brine valve 28 serves a dual function in that it controls both the outflow of brine solution from the reservoir 24 to the valve assembly 16 and the inflow of water to replenish the brine solution used during regeneration.

The control valve 16 is operative to connect one of the tanks 10, 12 to the household water supply and also controls the regeneration of an exhausted tank. The valve 16 also maintains a regenerated tank "off-line" until the "on-line" tank becomes exhausted. A complete description of the construction and operation of a control valve 16 along with a complete description of a dual tank water softening system can be found in U.S. Pat. No. 3,891,552, the disclosure of which is incorporated by reference.

Figure 2:
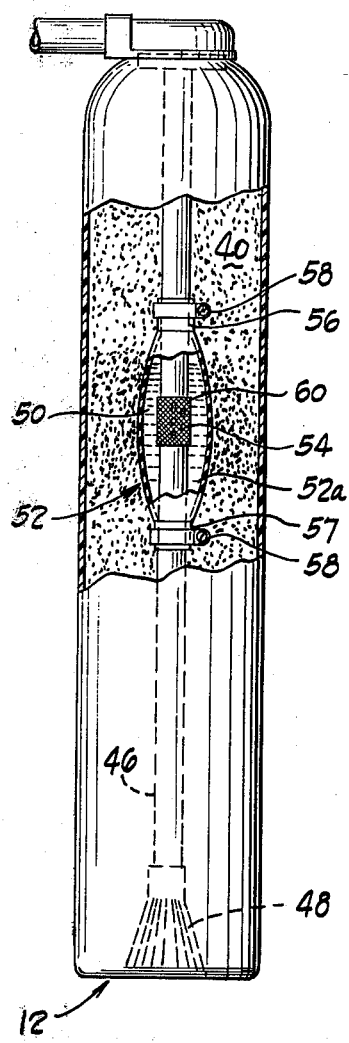
FIG. 2 is a side elevational view of a resin tank constructed in accordance with the preferred embodiment of the invention with portions broken away to show interior features.

The resin tank 10, 12 are of identical construction. The construction is shown in FIG. 2 as comprising an elongate, upstanding cylinder which is substantially filled with commonly available water ion exchange resin indicated generally by the reference character 40. The top of each tank has a threaded opening in which a part of the valve assembly 16 is secured. A conduit 46 extends downwardly and terminates in a screen 48 near the bottom of the tank. The screen 48 prevents the entry of resin 40 into the conduit 46.

According to the invention, an expansible chamber 50 is formed by a substantially amorphous, bladder-like member 52. The member 52 has a flexible membrane wall 52a located within the tank volume and is in fluid communication with the conduit 46. Fluid pressure in the conduit exerts an expansion force on the membrane wall 52a causing it to expand to fill any available tank volume.

The preferred embodiment the member 52 comprises an elastomeric sleeve constructed from a flexible material such as vinyl. The sleeve 52 surrounds a portion of the conduit 46 and overlies at least one, but preferably a plurality of apertures 54 formed in the conduit wall through which fluid communication between the interior of the conduit 46 and the chamber 50 is established. The ends 56, 57 of the sleeve 52 are sealingly clamped to the conduit 46 above and below the apertures 54 by suitable fasteners 58. Once the sleeve 52 is clamped to the conduit 46, the expansible chamber 50 is formed by the tubular membrane wall 52a that extends between the clamps 58. According to this embodiment, a filter screen 60 surrounds a portion of the conduit 46 and overlies the apertures 54. The screen 60 will prevent entry of resin particles into the conduit 46 if the sleeve 52 breaks or leaks.

The arrangement of the present invention becomes operative whenever fluid flow through the resin tank is "upflow", that is, from the lower end of the conduit 46 up through the resin bed softening chemicals 40. As discussed previously, a pressure drop occurs in the fluid as it travels through the tank as a result of fluid friction and flow resistance posed by the resin. As a result, the pressure of fluid flowing down the conduit is greater than pressure of fluid passing through the resin. This normal pressure drop is used to an advantage by the present invention. The fluid flowing down the conduit is communicated to the chamber 50 and this higher fluid pressure is thus applied to the interior of the membrane wall 52a. The fluid pressure on the outside of the wall 52a being lower than the inside results in a pressure differential that produces a net force on the wall 52a tending to expand it. This expansion force will cause the sleeve to expand if any "free space" exists in the tank. The bladder-like construction allows the member 52 to expand in any random direction and, although a symmetrical or overall expansion is shown in the drawings, a more localized expansion in small areas of the membrane wall 52a to fill "pockets" of free space is also contemplated. In this way, the resin 40 is maintained in a compacted state and thus resin fluffing and separation is minimized.

As seen in FIG. 2, the sleeve 52 and apertures 54 are positioned on the conduit 46 intermediate the top and bottom ends of the tank 12. With this construction, the inside of the wall 52a is exposed to the pressure of fluid flowing in the conduit 46 (via the apertures 54), upstream of the screen 48, where the pressure will generally be higher during fluid flow. The outside of the wall 52a is exposed to the pressure of fluid flowing in the resin bed, near the outlet (located at the top end of the tank 12) where the pressure is generally lower during fluid flow. Consequently, in this configuration, the pressure differential applied to the wall 52a is enhanced to promote expansion of the chamber 52, without requiring separate sources of fluid pressure as suggested by the prior art.

Because the sleeve 52 is expanded by the pressure differential of fluid flowing through the tank, the expansion force exerted by the sleeve will be proportional to the rate of fluid flow. It will be recognized by those skilled in the art, that the pressure drop in the fluid flowing through the tank is a function of the fluid flow rate and thus as the flow increases, the pressure differential felt by the wall 52a of the sleeve 52 will increase, thereby increasing the expansion force.

Figure 3:
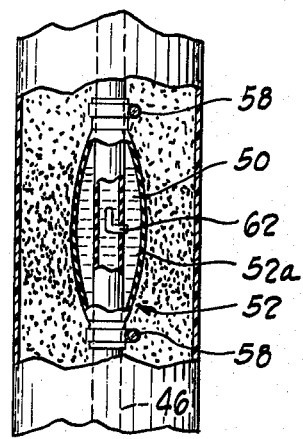
FIG. 3 is a fragmentary, sectional view of a resin tank showing an alternate embodiment of the present invention.

FIG. 3 illustrates an alternate embodiment of the invention. In this embodiment, a pitot tube 62 is used to communicate the fluid pressure in the conduit 46 to the chamber 50. The pitot tube 62 is disposed in the fluid flow path and thus communicates the velocity pressure of the fluid to the chamber 50. As is well known in the art, the veolcity pressure of a fluid in motion is generally greater than the static presssure and thus in this embodiment, the force exerted on the interior of the wall 52a of the sleeve 52 is increased for a given fluid flow rate. In this embodiment, the force tending to expand the chamber 50 will be increased for a given flow rate.

It should be apparent that the present invention provides a novel and improved resin tank construction which prevents resin bed separation or fluffing during "upflow service". In those systems employing downflow service with counterflow brining, the present invention eliminates the need for critical flow controls during regeneration. In short, whenever fluid flow proceeds from the conduit 46 up through the resin 40, the present invention operates to eliminate any "free space" in the tank and thereby prevents resin separation.

Although the invention has been described with a certain degree of particularity, it should be understood that various changes can be made to it by those skilled in the art without departing from the spirit or scope of the invention as described and hereinafter claimed.

I claim:
1. A water softening apparatus, comprising:
(a) a tank defining a volume containing water softening material;
(b) a fluid conduit extending longitudinally in said tank, defining an inlet at one end for introducing fluid, to be treated, into said tank;
(c) structure defining an outlet spaced from said inlet for discharging fluid from said tank after passing through at least a portion of said water softening material;
(d) an elastomeric member disposed within said tank, defining an expansible chamber having one side of a chamber wall in fluid communication with fluid flowing in said conduit upstream of said inlet and another side of said wall in fluid communication with fluid flowing through said portion of said water softening material;
(e) said chamber expanding in response to the net fluid force exerted on said chamber wall by the fluid flowing in said conduit and the fluid flowing in said portion of said water softening material, said chamber operative during fluid flow to enlarge to maintain compactness of the water softening material.

2. The apparatus of claim 1 wherein said expansible chamber is formed by an elastomeric sleeve fastened coaxially with said conduit and communicating with the fluid in said conduit through at least one aperture formed in a wall of said conduit.

3. The apparatus of claim 1 wherein said expansible chamber communicates with said conduit through a pitot tube that is disposed in the conduit flow path and communicates the velocity pressure of the fluid flowing in said conduit to said expansible chamber.

4. A water softening apparatus, comprising:
(a) a tank defining a volume containing water softening material;
(b) conduit means including an inlet disposed within said tank for introducing fluid, to be treated, into said tank;
(c) structure defining an outlet, spaced from said inlet for discharging fluid from said tank after passing through at least a portion of said water softening material;
(d) said conduit means including a conduit portion extending through said portion of said water softening material and located upstream of said inlet;
(e) an expansible chamber disposed in said tank including a chamber wall having a side in fluid communication with fluid flowing inside said conduit portion and having another side of said wall in fluid communication with fluid flowing through said water softening material, said chamber expanding in response to the pressure differential established on said chamber wall generated during fluid flow through said tank.

5. A water softening apparatus, comprising:
(a) a tank defining a volume substantially filled with a water softening material;
(b) a conduit means extending into said tank from one end to a predetermined distance from another end, said conduit means terminating in an opening defining an inlet for introducing water to be softened, into said tank and including at least one aperture located a spaced distance upstream from said inlet;
(c) structure defining an outlet near said one end of said tank for discharging softened water, said inlet and outlet defining a flow path through said water softening material that extends along at least a portion of said conduit means;
(d) an expansible chamber defined at least in part by a resilient wall having one side in fluid communication with said aperture in said conduit means, and having another side of said wall in fluid communication with water flowing through said water softening material such that an expanding pressure differential force is applied to said wall by the combination of water flowing in said conduit means as sensed through said aperture and by water flowing in said water softening material.

6. The apparatus of claim 5 further including a filter screen surrounding said conduit and covering said aperture thereby preventing the entry of water softening material into the conduit in the event of sleeve leakage.

7. The apparatus of claim 5 wherein said expansible chamber is formed by an elastomeric sleeve mounted coaxially on said conduit means and overlying said aperture.

8. The apparatus of claim 7 wherein said sleeve is clamped to said conduit means intermediate the ends of said tank.

9. A fluid treatment apparatus, comprising:
(a) a tank defining a volume substantially filled by a fluid treating material;
(b) a conduit extending into said tank having an end opening defining an inlet for introducing fluid to be treated;
(c) said tank including an outlet spaced from said inlet such that fluid traveling from said inlet to said outlet passes through at least a major portion of said water treatment material;
(d) an expansible chamber including an elastomeric wall having a side in fluid communication with the fluid flowing in said conduit, upstream of said inlet and further including another side of said wall in fluid communication with the fluid flowing through said fluid treatment material near said outlet, whereby the pressure differential between the fluid flowing in said conduit and in said fluid treatment material establishes an expansion force on wall of said chamber.

10. The apparatus of claim 9 wherein said conduit includes at least one aperture through which fluid communication with the one side of said wall is established and said chamber is formed by an elastomeric sleeve sealingly clamped to said conduit and overlying said aperture.

* * * * *